US007232975B2

(12) United States Patent
Kong et al.

(10) Patent No.: US 7,232,975 B2
(45) Date of Patent: Jun. 19, 2007

(54) PLASMA GENERATORS, REACTOR SYSTEMS AND RELATED METHODS

(75) Inventors: Peter C. Kong, Idaho Falls, ID (US); Robert J. Pink, Pocatello, ID (US); James E. Lee, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 383 days.

(21) Appl. No.: 10/727,033

(22) Filed: Dec. 2, 2003

(65) Prior Publication Data

US 2005/0115933 A1 Jun. 2, 2005

(51) Int. Cl.
*B23K 10/00* (2006.01)

(52) U.S. Cl. .......................... 219/121.57; 219/121.52; 219/121.36; 373/18

(58) Field of Classification Search ........... 219/121.36, 219/121.43, 121.4, 121.48, 121.49, 121.59, 219/483–486, 121.57, 121.52; 373/18–22
See application file for complete search history.

(56) References Cited

U.S. PATENT DOCUMENTS

| | | | | |
|---|---|---|---|---|
| 3,998,619 | A * | 12/1976 | Cerutti et al. | 65/135.7 |
| 4,013,867 | A | 3/1977 | Fey | |
| 4,282,393 | A * | 8/1981 | Williamson | 373/41 |
| 4,818,836 | A | 4/1989 | Bebber et al. | |
| 5,312,471 | A * | 5/1994 | Jung | 65/17.4 |
| 5,451,738 | A * | 9/1995 | Alvi et al. | 219/121.59 |
| 5,688,417 | A | 11/1997 | Cadre et al. | |
| 5,801,489 | A * | 9/1998 | Chism et al. | 315/111.21 |
| 5,935,293 | A | 8/1999 | Detering et al. | |
| 5,935,455 | A | 8/1999 | Glejbol | |
| 6,127,645 | A * | 10/2000 | Titus et al. | 219/121.36 |
| 6,407,382 | B1 | 6/2002 | Spangler | |
| RE37,853 | E | 9/2002 | Detering et al. | |
| 6,462,337 | B1 * | 10/2002 | Li et al. | 250/288 |
| 6,549,557 | B1 | 4/2003 | Bowman | |
| 2002/0093294 | A1 * | 7/2002 | Czernichowski et al. | 315/276 |

OTHER PUBLICATIONS

"3-Phase 100 kW AC Plasma," Centre d'Energetique, May 14, 2003, 3 pages.

* cited by examiner

*Primary Examiner*—Mark Paschall
(74) *Attorney, Agent, or Firm*—TraskBritt, P.C.

(57) ABSTRACT

A plasma generator, reactor and associated systems and methods are provided in accordance with the present invention. A plasma reactor may include multiple sections or modules which are removably coupled together to form a chamber. Associated with each section is an electrode set including three electrodes with each electrode being coupled to a single phase of a three-phase alternating current (AC) power supply. The electrodes are disposed about a longitudinal centerline of the chamber and are arranged to provide and extended arc and generate an extended body of plasma. The electrodes are displaceable relative to the longitudinal centerline of the chamber. A control system may be utilized so as to automatically displace the electrodes and define an electrode gap responsive to measure voltage or current levels of the associated power supply.

85 Claims, 13 Drawing Sheets

PLASMA GENERATORS, REACTOR SYSTEMS AND RELATED METHODS

STATEMENT OF GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

BACKGROUND OF THE INVENTION

1. Field of the Invention

The present invention relates generally to plasma arc reactors and systems and, more particularly, to a modular plasma arc reactor and system as well as related methods of creating a plasma arc.

2. State of the Art

Plasma is generally defined as a collection of charged particles containing about equal numbers of positive ions and electrons and exhibiting some properties of a gas but differing from a gas in being a good conductor of electricity and in being affected by a magnetic field. A plasma may be generated, for example, by passing a gas through an electric arc. The electric arc will rapidly heat the gas by resistive and radiative heating to very high temperatures within microseconds of the gas passing through the arc. Essentially any gas may be used to produce a plasma in such a manner. Thus, inert or neutral gasses (e.g., argon, helium, neon or nitrogen) may be used, reductive gasses (e.g., hydrogen, methane, ammonia or carbon monoxide) may be used, or oxidative gasses (e.g., oxygen or carbon dioxide) may be used depending on the process in which the plasma is to be utilized.

Plasma generators, including those used in conjunction with, for example, plasma torches, plasma jets and plasma arc reactors, generally create an electric discharge in a working gas to create the plasma. Plasma generators have been formed as direct current (DC) generators, alternating current (AC) plasma generators, as radio frequency (RF) plasma generators and as microwave (MW) plasma generators. Plasmas generated with RF or MW sources are called inductively coupled plasmas. For example, an RF-type plasma generator includes an RF source and an induction coil surrounding a working gas. The RF signal sent from the source to the induction coil results in the ionization of the working gas by induction coupling to produce a plasma. DC- and AC-type generators may include two or more electrodes (e.g., an anode and cathode) with a voltage differential defined therebetween. An arc may be formed between the electrodes to heat and ionize the surrounding gas such that the gas obtains a plasma state. The resulting plasma may then be used for a specified process application.

For example, plasma jets may be used for the precise cutting or shaping of a component; plasma torches may be used in applying a material coating to a substrate or other component; and plasma reactors may be used for the high-temperature heating of material compounds to accommodate the chemical or material processing thereof. Such chemical and material processing may include the reduction and decomposition of hazardous materials. In other applications plasma reactors have been utilized to assist in the extraction of a desired material, such as a metal or metal alloy, from a compound which contains the desired material.

Exemplary processes which utilize plasma-type reactors are disclosed in U.S. Pat. Nos. 5,935,293 and RE37,853, both issued to Detering et al. and assigned to the assignee of the present invention, the disclosures of each of these patents are incorporated by reference herein in their entireties. The processes set forth in the Detering patents include the heating of one or more reactants by means of, for example, a plasma torch to form from the reactants a thermodynamically stable high temperature stream containing a desired end product. The gaseous stream is rapidly quenched, such as by expansion of the gas, in order to obtain the desired end products without experiencing back reactions within the gaseous stream.

In one embodiment, the desired end product may include acetylene and the reactants may include methane and hydrogen. In another embodiment, the desired end product may include a metal, metal oxide or metal alloy and the reactant may include a specified metallic compound. However, as recognized by the Detering patents, gases and liquids are the preferred forms of reactants since solids tend to vaporize too slowly for chemical reactions to occur in the rapidly flowing plasma gas before the gas cools. If solids are used in plasma chemical processes, such solids ideally have high vapor pressures at relatively low temperatures. However, these type of solids are severely limited.

As noted above, process applications utilizing plasma generators are often specialized and, therefore, the associated plasma jets, torches and/or reactors need to be designed and configured according to highly specific criteria. Such specialized designs often result in a device which is limited in its usefulness. In other words, a plasma generator which is configured to process a specific type of material using a specified working gas to form the plasma is not likely to be suitable for use in other processes wherein a different working gas may be required, wherein the plasma is required to exhibit a substantially different temperature or wherein a larger or smaller volume of plasma is desired to be produced.

In view of the shortcomings in the art, it would be advantageous to provide a plasma generator and associated system which provides improved flexibility regarding the types of applications in which the plasma generator may be utilized. For example, it would be advantageous to provide a plasma generator and system which enables the direct processing of solid materials without the need to vaporize the solid materials prior to their introduction into the plasma. It would further be advantageous to provide a plasma generator and associated system which produces an improved arc and associated plasma column or volume wherein the arc and plasma volume may be easily adjusted and defined so as to provide a plasma with optimized characteristics and parameters according to an intended process for which the plasma is being generated.

BRIEF SUMMARY OF THE INVENTION

In accordance with one aspect of the invention an apparatus for generating a plasma is provided. The apparatus includes a chamber, a first set of electrodes and at least one other set of electrodes. Each set of electrodes may include three individual electrodes disposed about a longitudinal axis of the chamber and displaced along the longitudinal axis relative to any other set of electrodes. Each set of electrodes may further be configured for coupling with a single phase of a three-phase alternating current (AC) power supply. The electrode sets may be oriented at specified angles relative to the longitudinal axis and also disposed circumferentially about the longitudinal axis in a specified orientation.

In accordance with another aspect of the present invention, an arc generating apparatus is provided. The apparatus includes a first set of electrodes and at least one other set of electrodes. Each set of electrodes may include three individual electrodes disposed about a defined axis and displaced along the defined axis relative to any other set of electrodes. Each set of electrodes may further be configured for coupling with a single phase of a three-phase alternating current (AC) power supply. The electrode sets may be oriented at specified angles relative to the defined axis and also disposed circumferentially about the defined axis in a specified orientation.

In accordance with yet another embodiment of the present invention, a plasma arc reactor is provided. The reactor may include a first chamber section and at least one other chamber section which is removably coupled to the first chamber section. The chamber sections cooperatively define a chamber body. The reactor may further include a first set of electrodes associated with the first chamber section and at least one other set of electrodes associated with the other chamber section. Each set of electrodes may include three individual electrodes disposed about a longitudinal axis of the chamber body and displaced along the longitudinal axis relative to any other set of electrodes. Each set of electrodes may further be configured for coupling with a single phase of a three-phase alternating current (AC) power supply.

In accordance with a further aspect of the present invention, a system for processing materials is provided. The system may include a chamber having an inlet at a first end thereof and an outlet at a second end thereof. The system may further include a first set of electrodes and at least one other set of electrodes. Each set of electrodes may include three individual electrodes disposed about a longitudinal axis of the chamber and displaced along the longitudinal axis relative to any other set of electrodes. A first power supply including three-phase AC electrical service may be coupled with the first set of electrodes and another power supply including three-phase AC electrical service may be coupled to the other set of electrodes. The power supplies may each further include a silicon controlled rectifier (SCR) configured to control the phase angle firing of each electrode in an associated electrode set.

In accordance with yet another aspect of the present invention, a method is provided of generating a plasma. The method includes introducing a gas into a chamber and providing a first set of electrodes and at least a second set of electrodes. Each set of electrodes may include three individual electrodes disposed about a longitudinal axis of the chamber and displaced along the longitudinal axis relative to any other set of electrodes. The electrode sets are coupled with associated three-phase AC power supplies. An arc is produced among the electrodes of the first and second set of electrodes within the chamber in the presence of the gas to produce a plasma therein.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
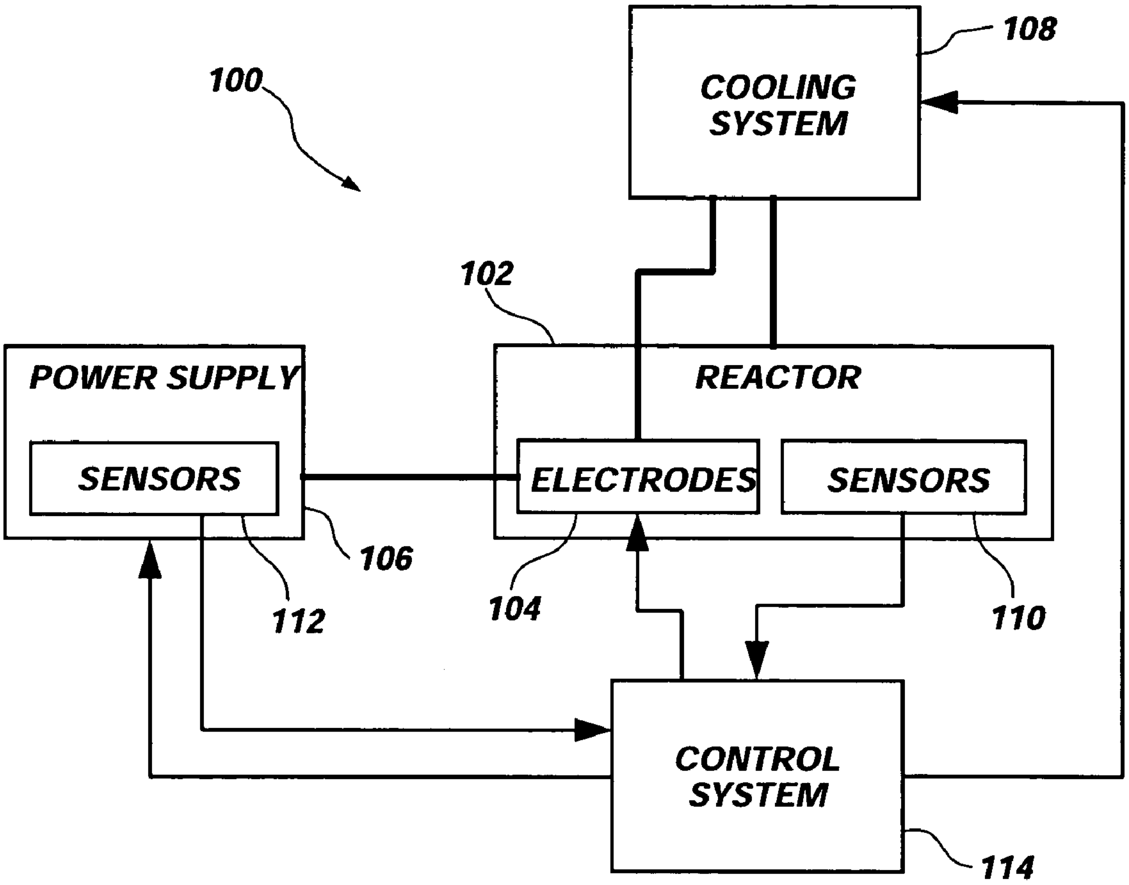
FIG. 1 is a schematic showing a plasma reactor system in accordance with an embodiment of the present invention.

Referring to FIG. 1, a schematic of a system 100 is shown which includes a plasma reactor 102. The reactor 102 may include a plurality of electrode assemblies 104 electrically coupled to a power supply 106. A cooling system 108 may be configured to transfer thermal energy from the reactor 102, from the electrode assemblies 104 or both. Sensors 110 may be utilized to determine one or more operational characteristics associated with the reactor 102 such as, for example, the temperature of one or more components of the reactor 102 or the flow rate of a material being introduced into and processed by the reactor 102. Similarly, sensors 112 or other appropriate devices may be utilized to determine various electrical characteristics of the power being supplied to the electrodes 104.

A control system 114 may be in communication with various components of the system 100 for collection of information from, for example, the various sensors 110 and 112 and for control of, for example, the power supply 106, the cooling system 108 and/or the electrode assemblies 104 as desired. While not specifically shown, the control system 114 may include a processor, such as a central processing unit (CPU), associated memory and storage devices, one or more input devices and one or more output devices. In another embodiment, the control system 114 may include an application specific processor such as a system on a chip (SOC) processor which includes one or more memory devices integrally formed therewith.

Figure 2:
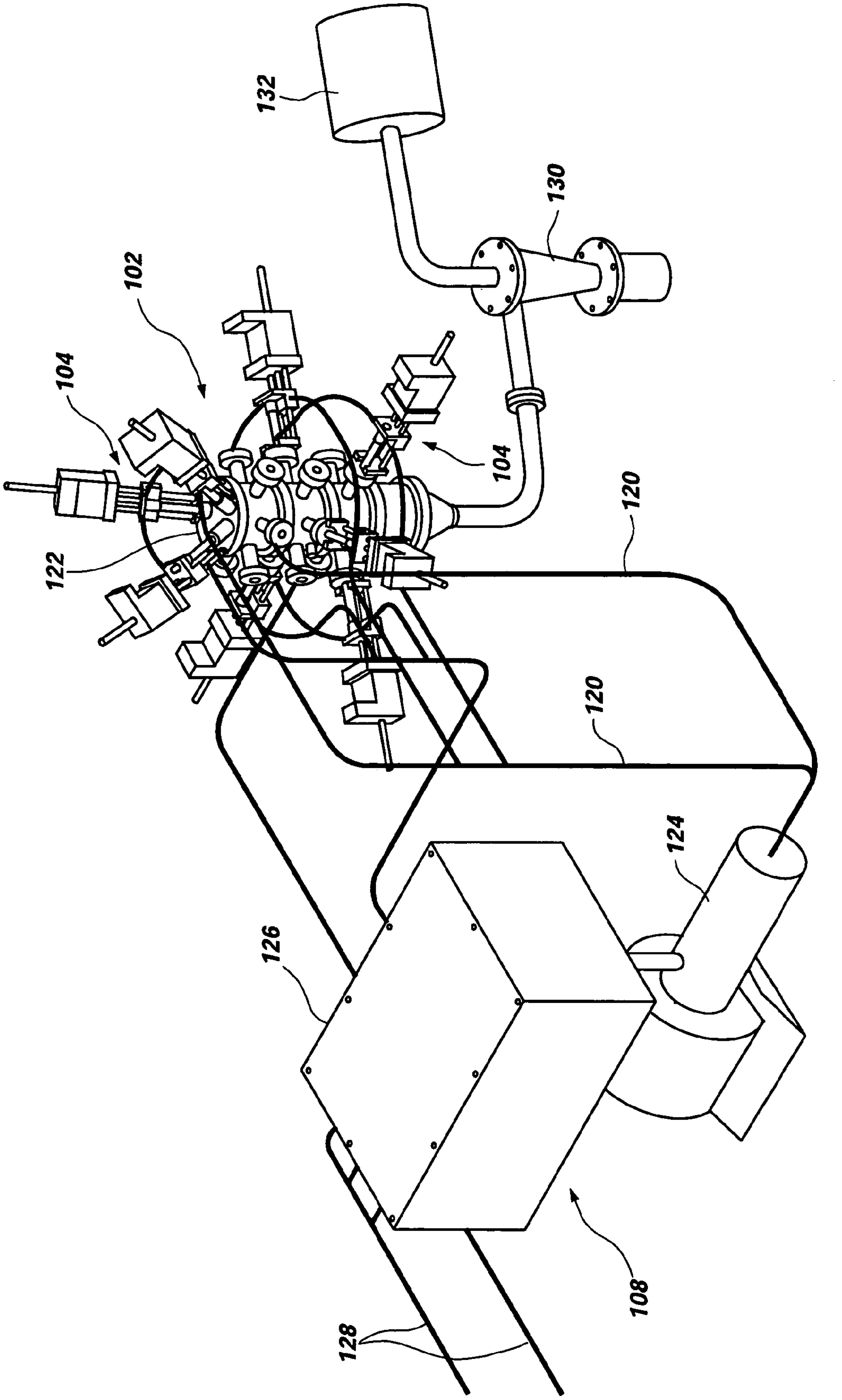
FIG. 2 is a perspective view of a portion of the system of FIG. 1.

Referring to FIG. 2, a perspective view is shown of a reactor 102 and an associated cooling system 108 in accordance with an embodiment of the present invention. The cooling system 108 may include a plurality of cooling lines 120, such as tubing or conduits, configured to circulate a cooling fluid through various portions of the reactor 102. For example, the cooling lines 120 may circulate cooling fluid to individual electrode assemblies 104 or to portions of a chamber 122 which acts as a housing for the reactor 102. A pump 124 may circulate the fluid through the cooling lines 120, through the various components of the reactor 102 and then back to a heat exchanger 126. The cooling fluid circulated through the cooling lines 120 serves to transfer thermal energy away from various components of the reactor 102 such as the electrode assemblies 104 and/or the reactor chamber 122. The cooling fluid then flows through the heat exchanger 126, to transfer any thermal energy accumulated by the cooling fluid thereto, and is then recirculated through the cooling lines 120.

The heat exchanger 126 may include, for example, a counterflowing arrangement wherein the cooling fluid circulated through the cooling lines 120 flows in a first direction along a defined path within the heat exchanger 126 and wherein a second fluid is introduced through additional conduits 128 to flow in a second path adjacent to the first flow path but in a substantially opposite direction thereto. The counterflowing arrangement allows heat or thermal energy to be transferred from the cooling fluid of the cooling lines 120 to the second fluid flowing through the additional conduits 128. The fluid introduced through the additional conduits 128 may include, for example, readily available plant water or an appropriate refrigerant.

Of course, other types of heat exchangers may be used including, for example, ambient or forced air type heat exchangers, depending on various heat transfer requirements. Those of ordinary skill in the art will recognize that the heat exchanger, pump and other equipment associated with the cooling system 108 may be sized and configured in accordance with the amount of thermal energy which is to be removed from the reactor 102 and that various types of systems may be utilized to effect such heat transfer.

As noted above, the reactor 102 may include a housing or chamber 122 in which chemical processes, material processes or both may be carried out. The reactor chamber 122 may be coupled with additional processing equipment such as, for example, a cyclone 130 and a filter 132, for separating and collecting the materials processed through the reactor 102.

Referring to FIG. 3, an enlarged, partial cross-sectional view of the reactor chamber 122 is shown. The reactor chamber 122 includes various chamber sections 122A–122C. The chamber 122 may further include an outlet section 122D which may, for example, include a converging nozzle and an outlet conduit for flowing materials out of the chamber 122.

The chamber sections 122A–122C may each include various ports formed through the sidewalls thereof. Such ports may be configured as view ports 140A, as electrode ports 140B, or as coolant ports 140C for coupling with an associated cooling line 120 (FIG. 2).

Associated with each chamber section 122A–122C is an electrode set, which may also be referred to herein as a torch. For example, the first chamber section 122A may have plurality of electrode assemblies 104A–104C associated therewith, the second chamber section may have a plurality of electrode assemblies 104D–104F (electrode assembly 104F not shown in FIG. 3A) associated therewith, and the third chamber section 122C may have a plurality of electrode assemblies 104G–104I (electrode assembly 104I not shown in FIG. 3A) associated therewith.

Figure 3A:
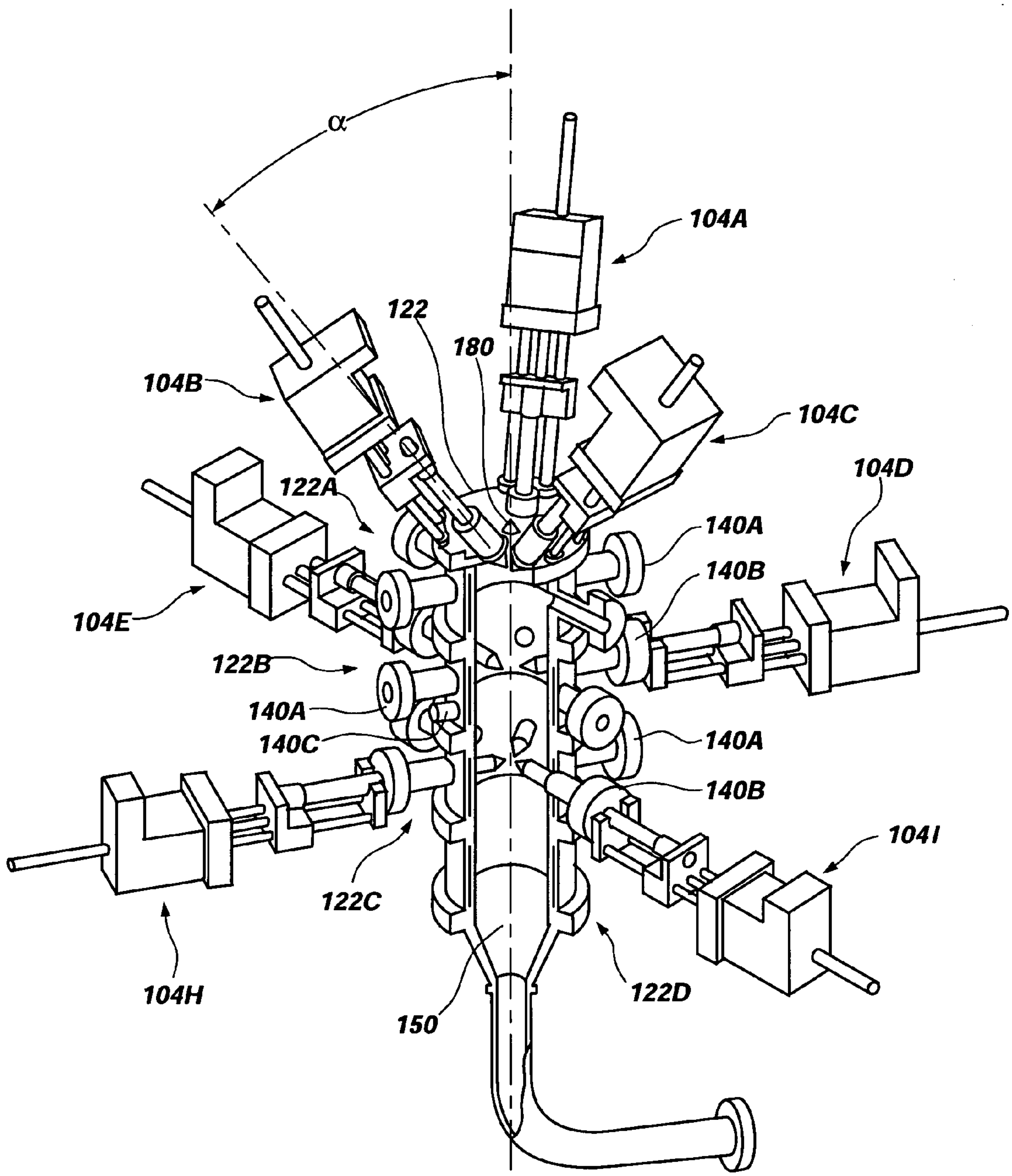
FIGS. 3A–3C show partial cross-sectional views of an exemplary plasma reactor at various levels of detail.
Figure 3B:
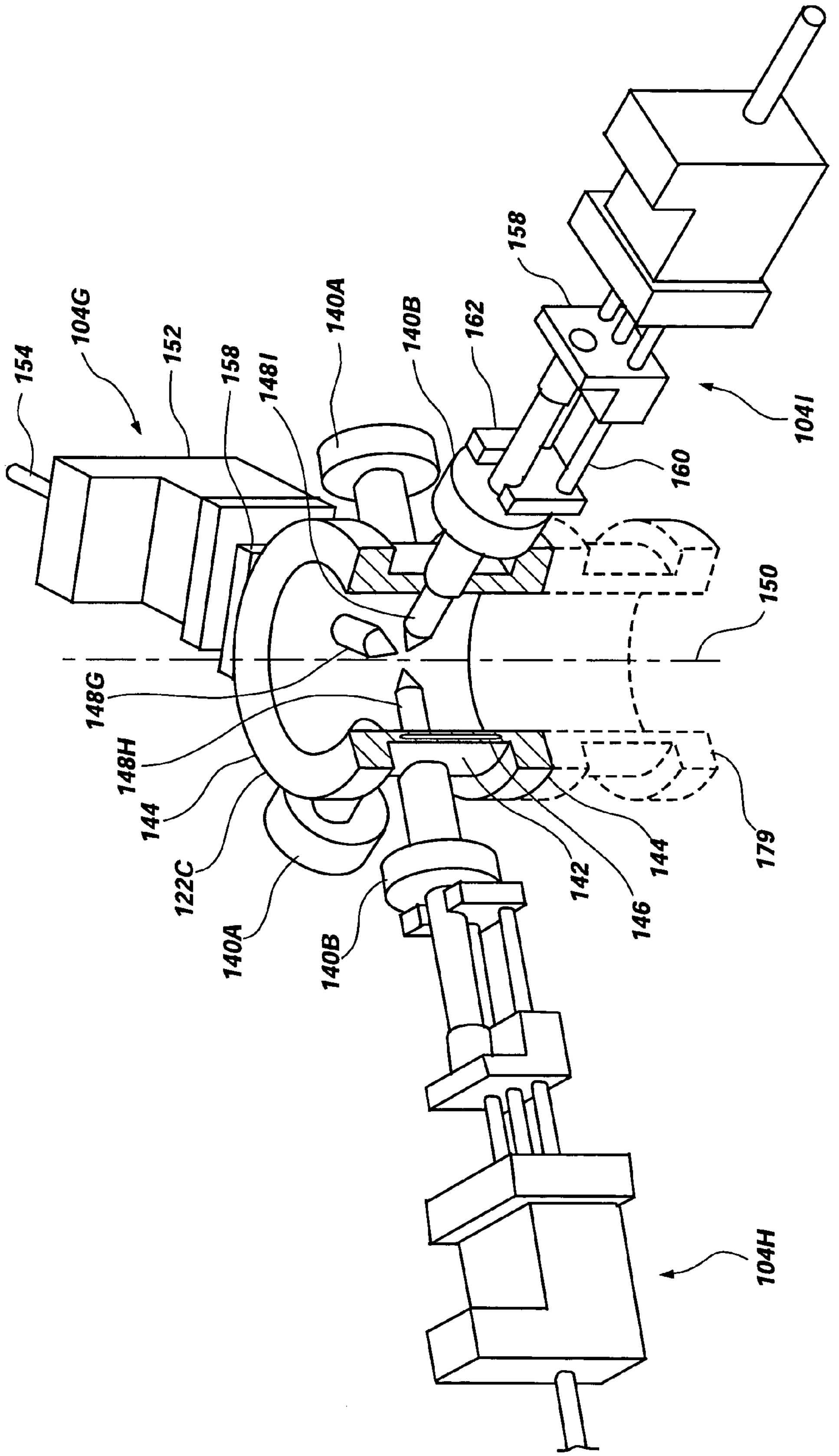

Referring to FIG. 3B, a chamber section 122C and associated electrode assemblies 104G–104I are shown in greater detail. The chamber section 122C may include, for example, a generally tubular body 142 having a flange 144 coupled therewith at each end of the body 142. The flanges 144 may be configured for coupling to flanges of adjacent sections (e.g., chamber section 122B and outlet section 122D). A pocket or channel 146 may be formed in the body 142. For example, in one embodiment, the body 142 may be formed from two concentric tubular members which are sized and positioned relative to one another so as to leave a substantially annular gap therebetween, the annular gap defining the pocket or channel 146. The cooling ports 140C (FIG. 3B) may be in fluid communication with the channel 146 so as to circulate cooling fluid therethrough and maintain the chamber section 122C at a desired temperature.

The electrode assemblies 104G–104I are coupled with the electrode ports 140B such that electrodes 148G–148I extend through their respective electrode ports 140B, through the body 142 and into the interior portion of the chamber section 122C. The electrodes 148G–148I may be formed, for example, as graphite electrodes. In another embodiment, the electrodes may be formed as a substantially hollow metallic members configured to receive a cooling fluid therein.

As shall be discussed in greater detail below, the electrodes 148G–148I may be symmetrically arranged circumferentially about a longitudinal axis 150 of the chamber section 122C (and of the reactor chamber 122) and configured to provide an arc and also establish a plasma within any gas which may be present within the reactor chamber 122.

Figure 3C:
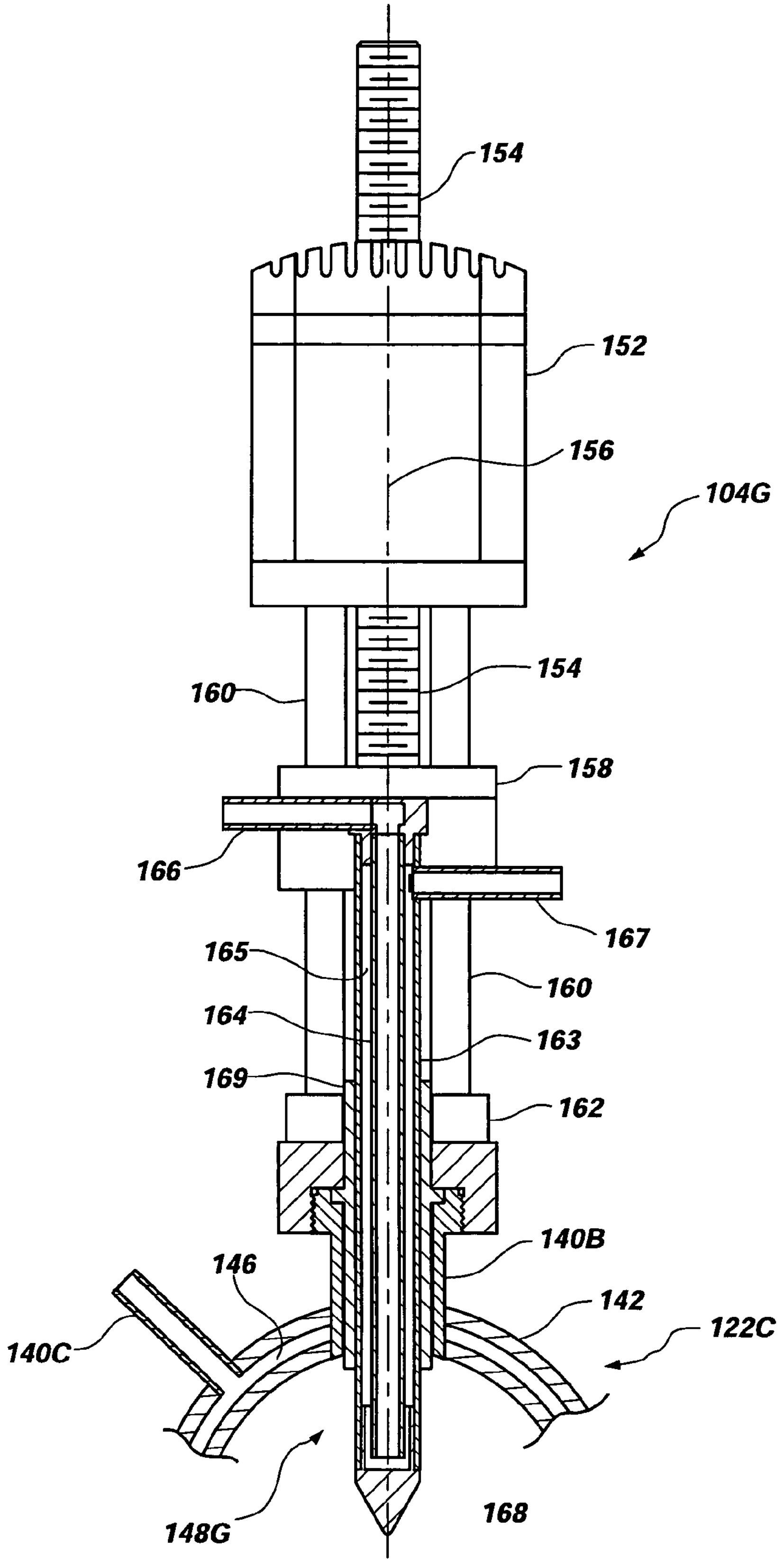

Referring to FIG. 3C along with FIG. 3B, FIG. 3C shows a partial cross-sectional view of the chamber section 122C and an associated electrode assembly 104G in further detail. As noted above, the electrode assembly 104G is coupled with an electrode port 140B. The electrode assembly 104G includes an electrode 148G which extends into an interior region of the chamber section 122C as defined by the body 142. The electrode assembly 104G further includes an actuator 152 which is configured to adjust the position of the electrode 148G relative to the chamber section 122C. For example, the actuator 152 may include a threaded drive rod 154 which is linearly displaceable along a defined axis 156. The actuator may include, for example, a linear positioning servo motor configured to control the position of the drive rod 154 as will be appreciated by those of ordinary skill in the art.

A slidable frame member 158 may be coupled to the drive rod 154 and slidably disposed about one or more linear rod bearings 160 which extend between the actuator 152 and a coupling member 162 and substantially parallel to the defined axis 156. The coupling member 162 is mechanically coupled with the electrode port 140B thereby fixing the relative position of the actuator 152, linear rod bearings 160 and coupling member 162 relative to the chamber section 122C.

The slidable frame member 158 is also coupled with the electrode 148G and, upon displacement of the slidable frame member 158 by way of the actuator 152 and associated drive rod 154, effects displacement of the electrode 148G relative to the chamber section 122C in a direction generally along the defined axis 156. The electrode assemblies 104–104I are thus adjustable so that an arc gap, or distance between adjacent electrodes 148G–148I, may be set to obtain a desired arc therebetween. Additionally, as the electrodes 148G–148I wear due to repeated arcing, they may be advanced by their associated actuators 152 so as to maintain a desired arc gap.

As also shown in FIG. 3C, the electrode 148G may include a first tubular member 163 and a second tubular member 164 which may be disposed substantially concentrically within the first tubular member 163. The first and second tubular members 163 and 164 may be sized, located and configured such that an annular gap 165 is defined therebetween. A fluid inlet 166 may be in fluid communication with an interior portion of the second tubular member 163 and a fluid outlet 167 may be in fluid communication with the annular gap 165. Thus, in operation, cooling fluid may be introduced through the fluid inlet 166, flow through the interior of the second tubular member 164, into the annular gap 165 and out of the fluid outlet 167. Such a configuration enables efficient cooling of the electrode 148G and improves the operating life thereof.

The tubular members 163 and 164 may be formed of, for example, a metallic material which is both electrically and thermally conductive. Additionally, the electrode 148G may include a replaceable tip 168 which is removably coupled with, for example, the first tubular member 163 such that worn tips may be replaced when desired. Additionally, the electrode assembly 104G may include an electrically insulating sleeve 169 disposed, for example, between the first tubular member 163 and the electrode port 140B to insulate the electrode therefrom. Such a sleeve 169 may be formed of, for example, boron nitride or a composite material of boron nitride and aluminum nitride.

The electrode sets, as associated with each chamber section 122A–122C, may be configured geometrically to provide a desired arc and associated plasma column therefrom. For example, referring to FIGS. 3A and 4, in one embodiment, each of the electrodes 148A–148C of the first set may be positioned and oriented such that they extend from the reactor chamber 122 (represented in FIG. 4 as a dashed line for purposes of clarity) to define an acute angle $\alpha$ (FIG. 3A) with respect to the longitudinal axis 150. Another set of electrodes 148D–148F may be displaced from the first set of electrodes 148A–148C a desired distance and oriented such that they extend substantially transverse to the longitudinal axis 150. A further set of electrodes 148G–148I may be displaced from the first set of electrodes 148D–148F a desired distance and may be oriented such that they also extend substantially transverse to the longitudinal axis 150.

Figure 5A:
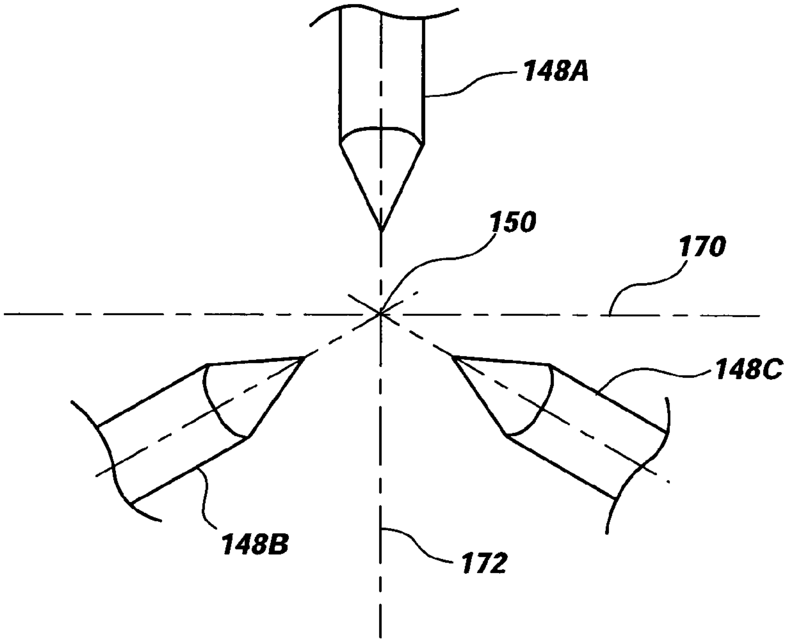
FIGS. 5A–5C are plan views of various electrode sets as indicated in FIG. 4.

Referring to FIG. 5A, the first set of electrodes 148A–148C may be circumferentially arranged substantially symmetrically about the longitudinal axis 150, as represented by the intersection of two other Cartesian axes 170 and 172 which are orthogonal with respect to each other as well as to the longitudinal axis 150 (FIG. 3A). For example, the angle of one electrode (e.g., 148A) relative to an adjacent electrode (e.g., 148B) may be approximately 120°. More particularly, relative to the defined axes 170 and 172, a first electrode 148A may be positioned at approximately a 90° orientation, a second electrode 148B may be positioned at approximately a 210° orientation, and a third electrode 148C may be positioned at approximately a 330° orientation.

Figure 5B:
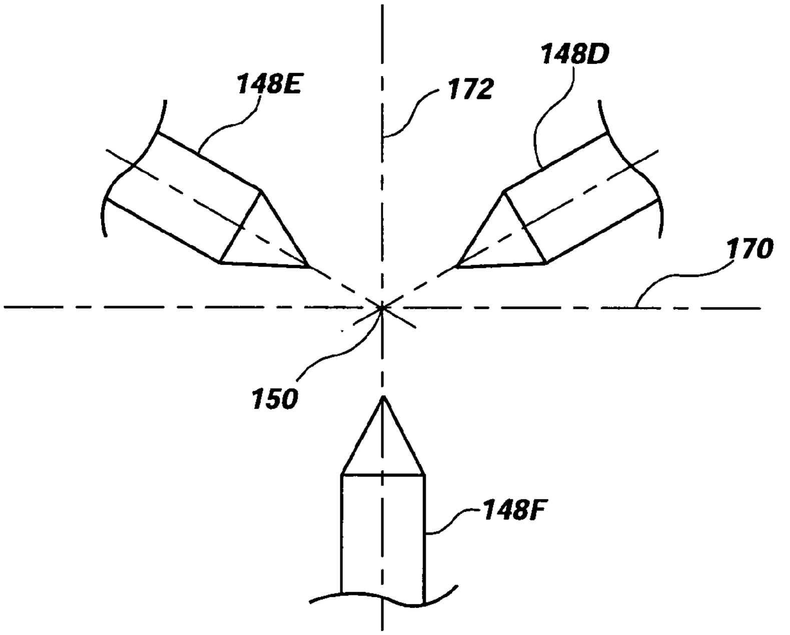

Referring to FIG. 5B, the second set of electrodes 148D–148F may also be circumferentially arranged substantially symmetrically about the longitudinal axis 150 but at a different orientation relative to the defined axes 170 and 172 as compared to the first set of electrodes 148A–148C. For example, relative to the defined axes 170 and 172, a first electrode 148D may be positioned at approximately a 30° orientation, a second electrode 148D may be positioned at approximately a 150° orientation, and a third electrode 148F may be positioned at approximately a 270° orientation.

Figure 5C:
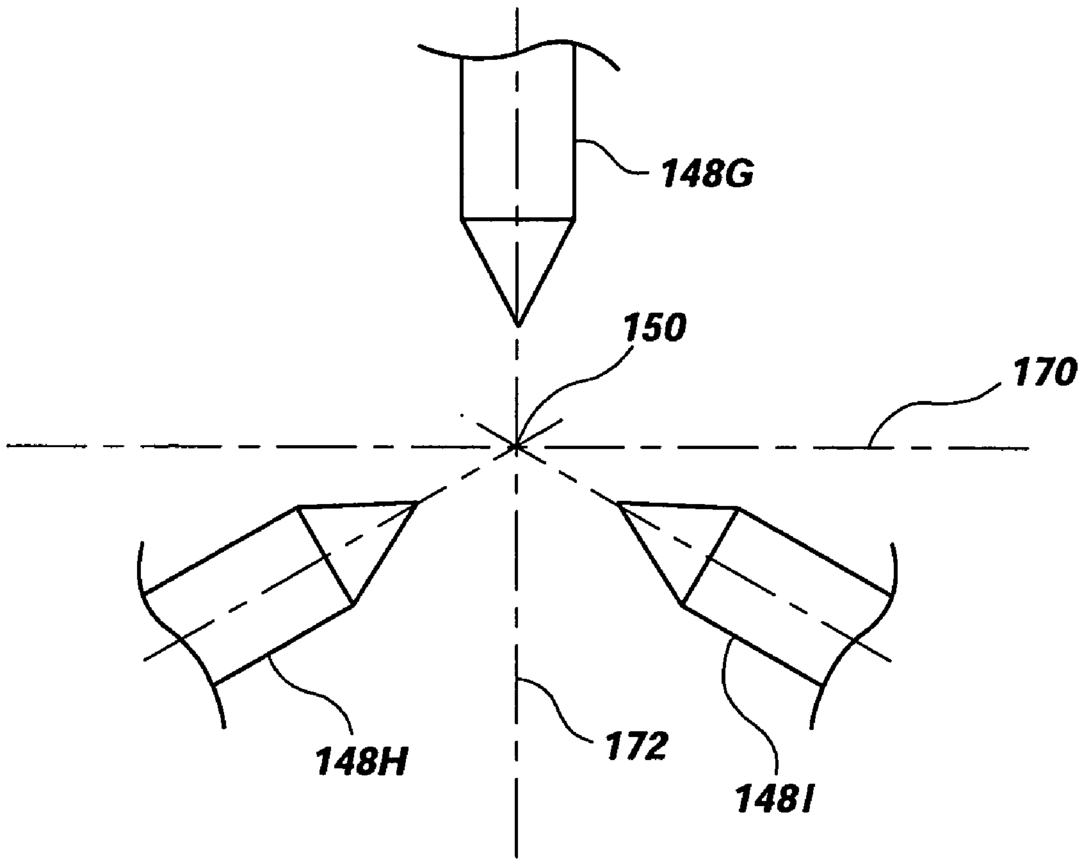

Referring to FIG. 5C, the third set of electrodes 148G–148I may also be arranged substantially symmetrically about the longitudinal axis 150 but at a different orientation relative to the defined axes 170 and 172 as compared to the second set of electrodes 148D–148F. For example, relative to the defined axes 170 and 172, a first electrode 148G may be positioned at approximately a 90° orientation, a second electrode 148H may be positioned at approximately a 210° orientation, and a third electrode 148I may be positioned at approximately a 330° orientation. Thus, the first set of electrodes 148A–148C may be oriented similarly to the third set of electrodes 148G–148I.

It is noted that in such an electrode configuration as described with respect to FIGS. 4 and 5A–5C, the first set of electrodes 148A–148C exhibits a first angular orientation or arrangement about the longitudinal axis 150 while the second set of electrodes 148D–148 exhibits a second angular orientation about the longitudinal axis 150 such that, when viewed from a plane transverse to the longitudinal axis 150, the electrodes 148D–148F of the second set appear to be rotationally interspersed among the electrodes 148A–148C of the first set. A similar arrangement is noted with respect to the second set of electrodes 148D–148F and the third set of electrodes 148G–148I.

Such a configuration provides the advantage of a uniform distribution of electrodes 148A–148I within the chamber 122 for the production of a long, high temperature arc between the electrodes 148A–148I. The resultant high temperature arc provides substantial thermal energy for heating, melting and evaporating various materials. The arc also produces a substantially uniform column or body of plasma within the reactor chamber 122. Furthermore, the stacked arrangement of electrode sets (i.e., 148A–148C, 148D–148F and 148G–148I) and the resulting lengthened arc and plasma column provide a longer residence time for any reactant flowing therethrough. Thus, due to the modular nature of the reactor 102 (FIG. 2), including the separate chamber sections 122A–122C, a column of plasma of variable length may be formed by introducing additional chamber sections or removing existing chamber section to tailor the resultant plasma to a desired process. Additionally, a spacer 179, such as is shown in FIG. 3B, may be coupled to each end of a chamber sections 122A–122C (FIG. 3A) to alter the distance along the longitudinal axis between adjacent electrode sets (e.g., 148A–148C and 148D–148F). In other words, while only shown on the lower portion of the chamber section 122C in FIG. 3B for purposes of clarity, a similar spacer 179 may be disposed at each end of the chamber section such that at least one spacer 179 is disposed between each chamber sections 122A–122C.

Figure 4:
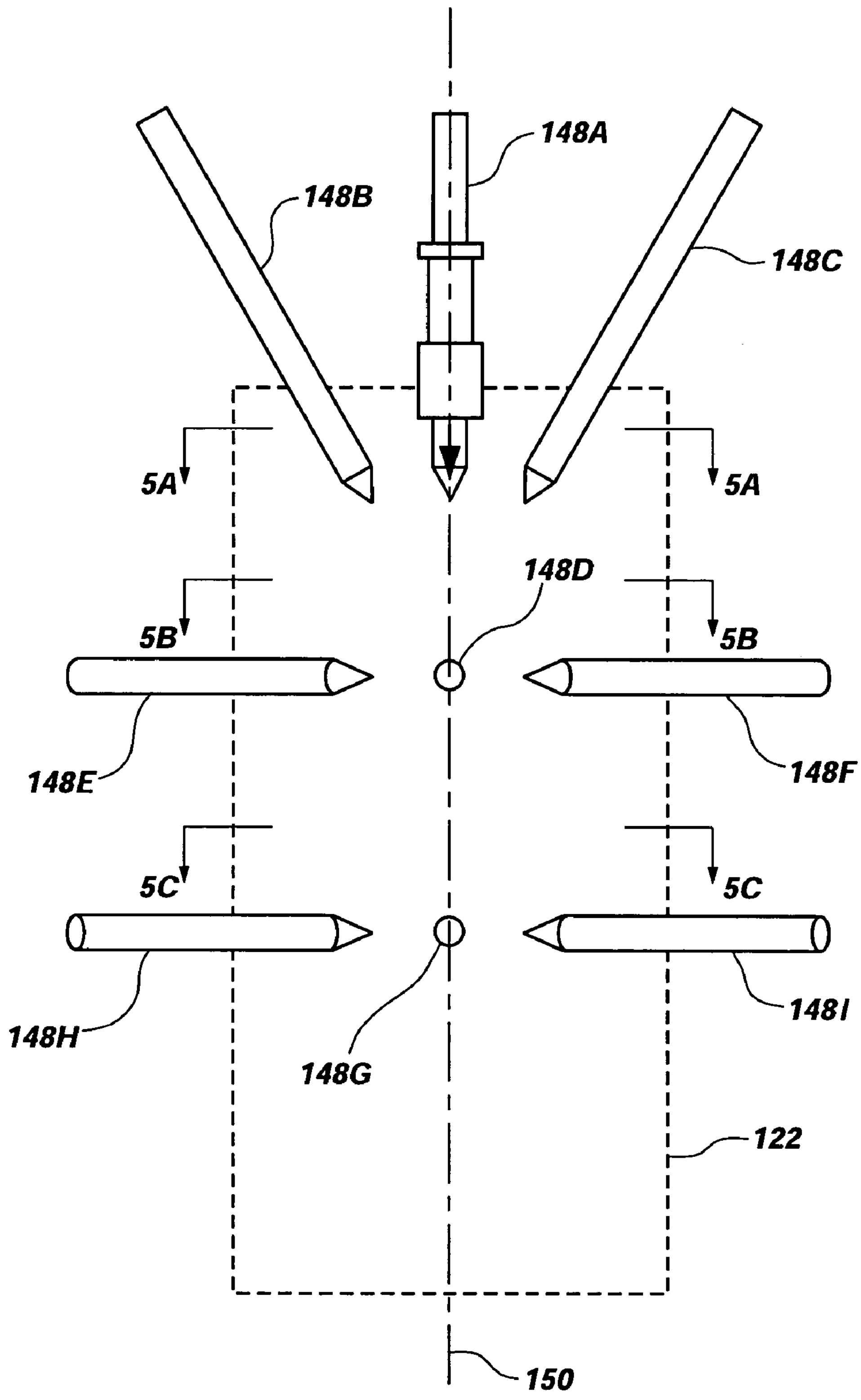
FIG. 4 is a schematic side view of an electrode arrangement which may be utilized in conjunction with the reactor of FIG. 3.

It is further noted that the various sets of electrodes 148A–148C, 148D–148F and 148G–148I may exhibit different angular orientations than that which is described with respect to FIGS. 4 and 5A–5C. For example, with the first set of electrodes 148A–148C configured as shown in FIGS. 4 and 5A, the second set of electrodes 148D–148F may be oriented, relative to the defined axes 170 and 172, at 10°, 130° and 250°, respectively, while the third set of electrodes 148G–148I may be oriented, relative to the defined axes 170 and 172, at 50°, 170° and 290°, respectively. Of course other arrangements may be utilized depending, for example, on the number of electrode sets being utilized and the distance between each electrode set along the longitudinal axis 150.

Referring back to FIGS. 3A and 4, an inlet 180 may be formed in the chamber to introduce materials, such as reactants, into the reactor chamber 122. In one particular embodiment, the inlet 180 may be configured to introduce materials along the longitudinal axis 150 such that materials pass through the center of the arc formed by the plurality of electrodes 148A–148I. The ability to pass materials substantially through the center of the arc enables the melting and/or evaporation of solid materials such that preconditioning of such materials is not required prior to their introduction into the chamber 122.

Figure 6:
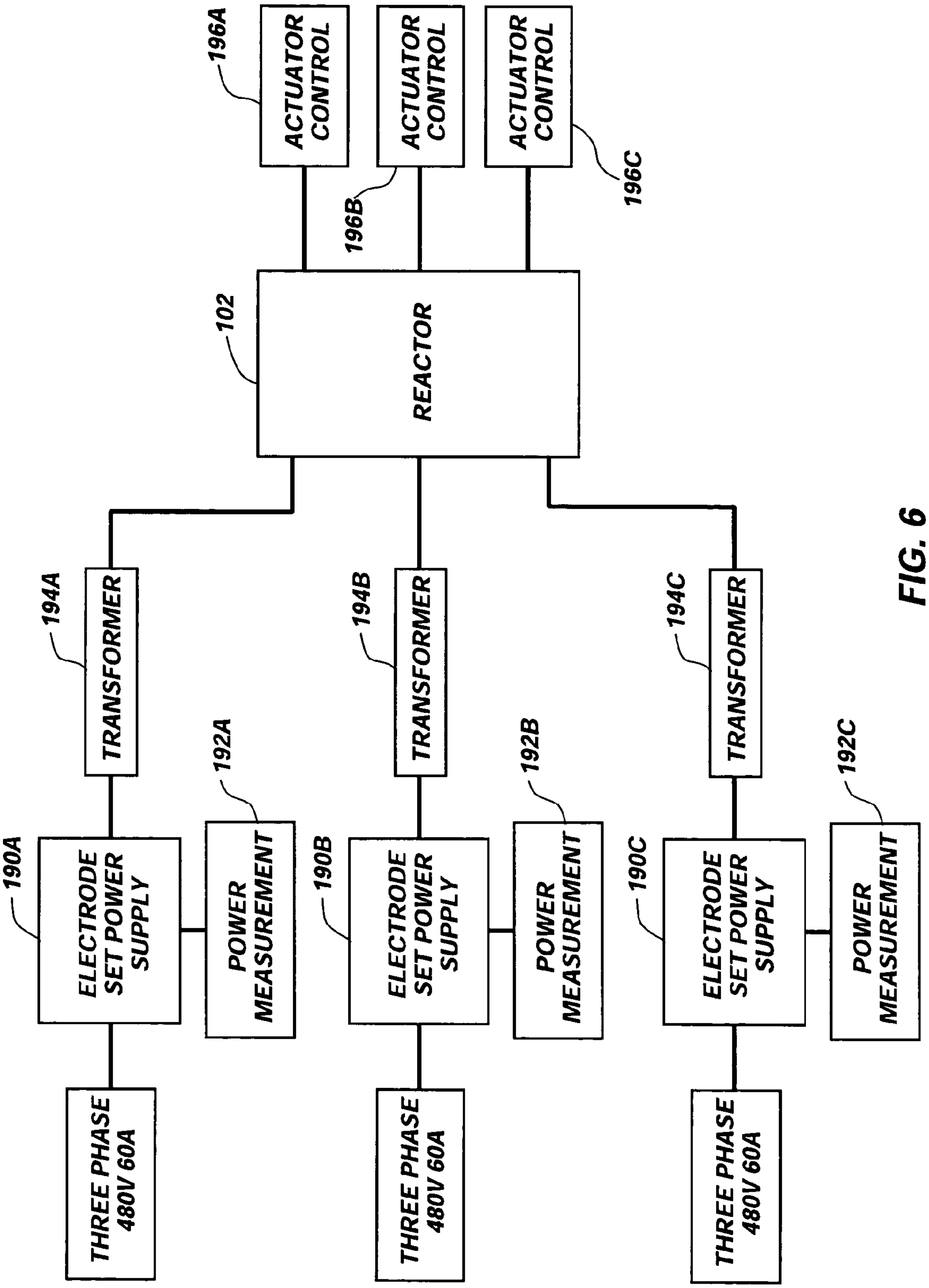
FIG. 6 is a schematic showing the independent power supply and control of multiple electrode sets in accordance with an embodiment of the present invention.

Referring now to FIG. 6, an exemplary schematic is shown of the reactor 102 regarding the power supply and related actuator control. Electrical service 188A–188B provides three phase alternating current (AC) power at 480 volts (V) and 60 amps (A) to individual electrode set power supplies 190A–190C. A power measurement device or system 192A–192C may be associated with each power supply 190A–190C. Each power measurement system 192A–192C may be configured to monitor, for example, the voltage and current of each phase of power for its associated power supply 190A–190C.

A transformer 194A–194C may be coupled between the each power supply 190A–190C and the reactor 102. More specifically, each transformer 194A–194C may be coupled between an associated power supply 190A–190C and a defined set of electrodes (e.g., electrodes 148A–148C, 148D–148F or 148G–148I). A plurality of actuator control devices 196A–196C are also coupled the reactor 102. More particularly, each actuator control device 196A–196C is coupled to the actuators 152 (FIGS. 3B, 3C) of a defined set of electrodes.

Figure 7:
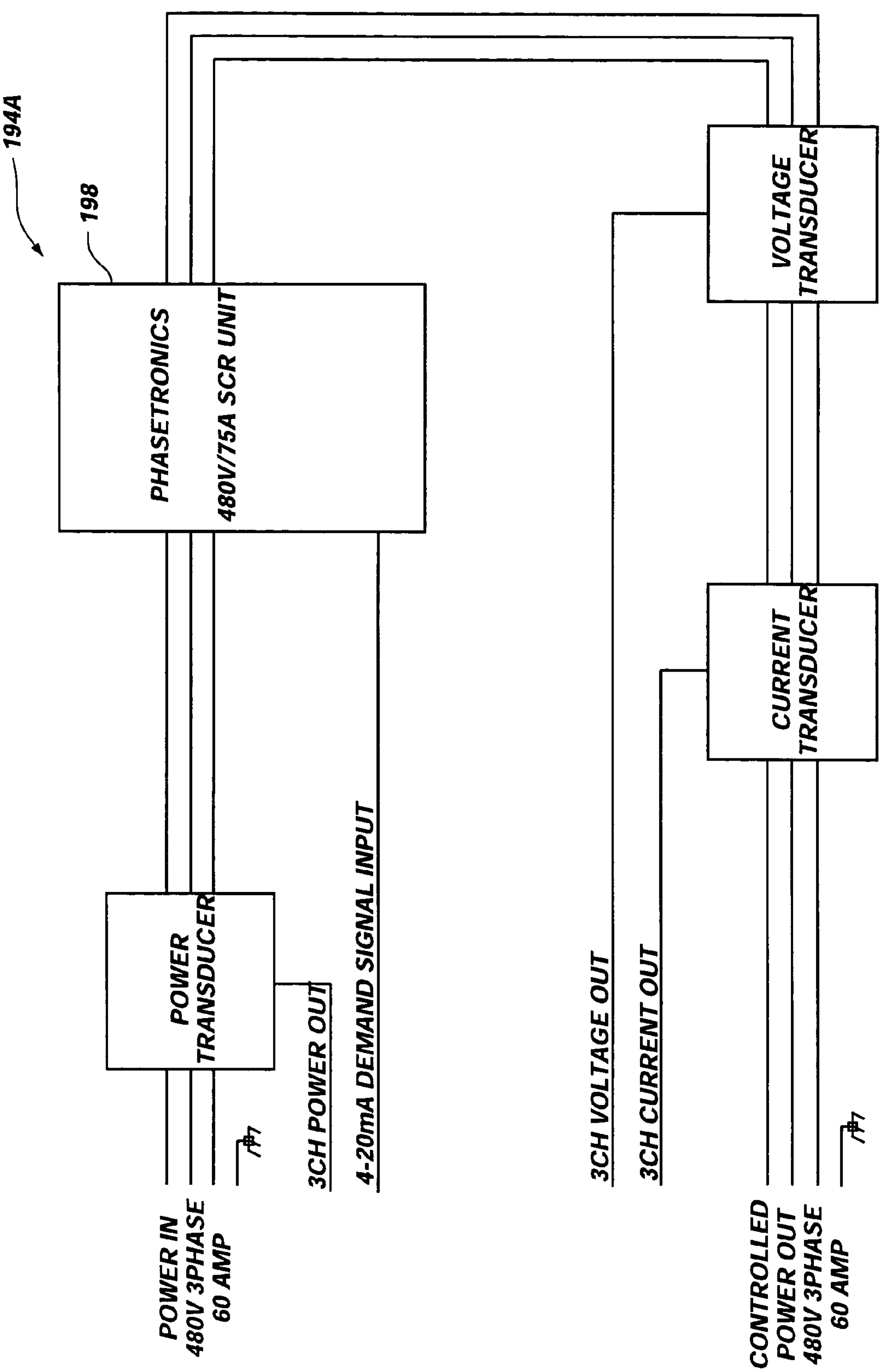
FIG. 7 is a general schematic of a power supply for an individual electrode set.
Figure 8:
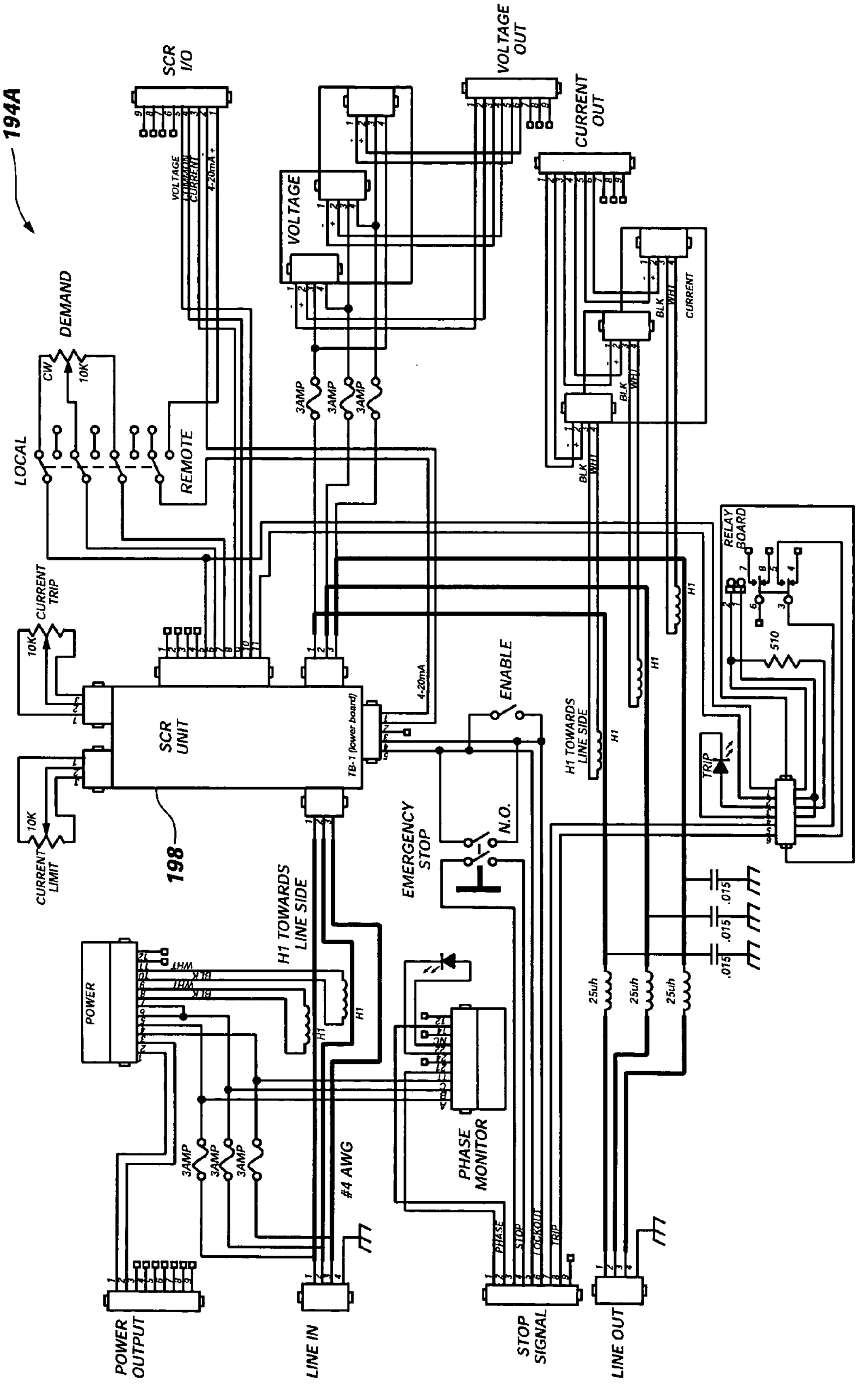
FIG. 8 is a more detailed schematic of a power supply for an individual electrode set in accordance with an embodiment of the present invention.

Referring to FIGS. 7 and 8, exemplary schematics of an electrode set power supply 190A are shown. It is noted that the power supply 190A may include a silicon controlled rectifier (SCR) 198. With a single phase of each three phase power supply being coupled to a single electrode (e.g., electrode 148A) of an electrode set (e.g., 148A–148C), the SCR 198 may be used to control the phase angle firing of each electrode. In one particular embodiment the SCR 198 may be rated at 480 V and 75 A. Such a device is commercially available from Phasetronics of Clearwater, Fla.

Referring briefly to FIG. 8, an exemplary schematic is shown of a transformer 194A which may be used in accordance with an embodiment of the invention. The transformer 194A is utilized to limit the high instantaneous currents associated with arc ignition. More particularly, the inductive reactance of the transformer reduces the initial current from the associated power supply 190A such that circuit protection devices are not activated.

Figure 9:
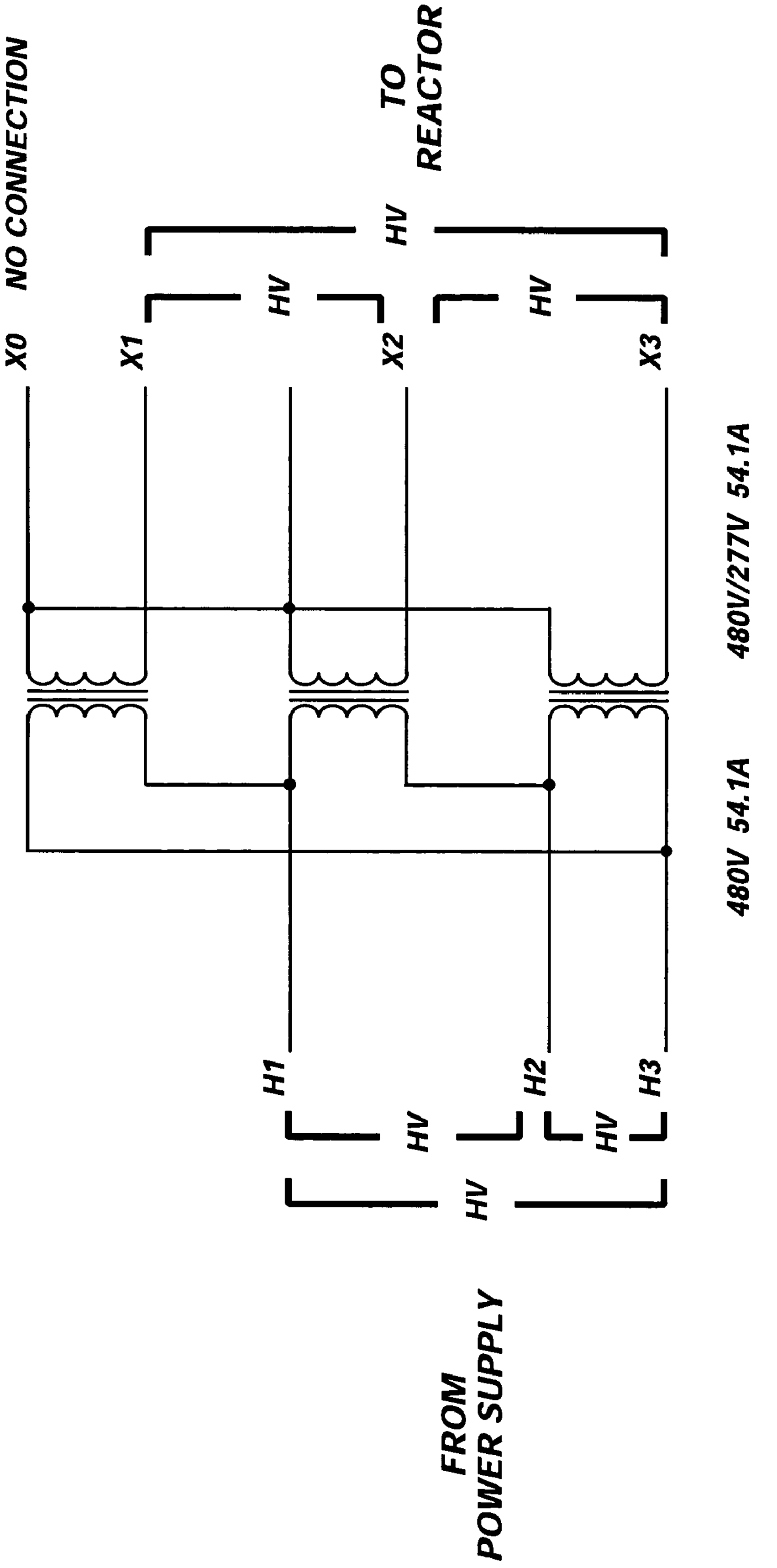
FIG. 9 is a schematic of a transformer connection diagram which may be used in a plasma reactor system in accordance with an embodiment of the present invention.
Figure 10:
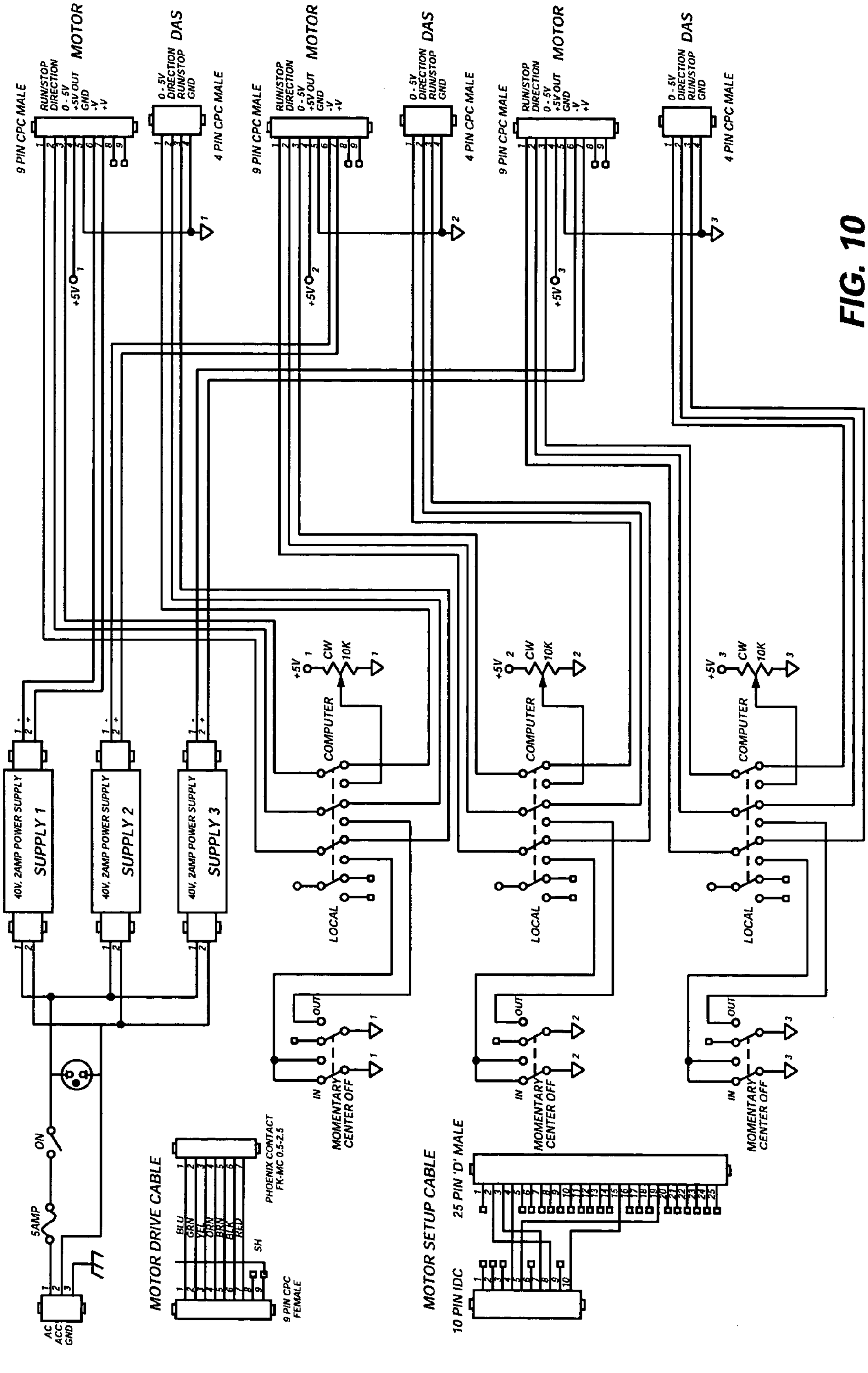
FIG. 10 is a schematic of a motor control diagram associated with the placement of individual electrodes in accordance with an embodiment of the present invention.

Referring to FIG. 9, an exemplary schematic is shown for an actuator control system or device 196A. The control of actuators 152 (FIGS. 3A and 3B) may be responsive, for example, to measured current and voltage values of the individual phases of electrical power which are coupled with electrodes. Based on the current and voltage measurements taken from an associated power supply (e.g., 190A), individual electrodes of a given set (e.g., electrodes 148A–148C) may be displaced, as discussed above, to change the gap or distance therebetween. Continual monitoring of the voltage and/or current and attendant adjustment of the individual electrodes of an electrode set enables a more efficient arc production by such electrodes. Additionally, during startup, the actuators may be controlled so as to define a smaller gap among the electrodes to provide easier startup of the reactor. Upon establishment of an arc, the electrodes may be repositioned for optimal performance during normal operation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A plasma generating apparatus comprising:

a chamber;

a first set of electrodes comprising three electrodes, wherein each electrode of the first set of electrodes is configured to be coupled to a single phase of a three phase alternating current (AC) power supply, the three electrodes of the first set of electrodes being circumferentially disposed about a longitudinal axis of the chamber; and at least another set of electrodes comprising three electrodes, wherein each electrode of the at least another set of electrodes is configured to be coupled to a single phase of another three phase alternating current (AC) supply, the three electrodes of the at least another set of electrodes being circumferentially disposed about the longitudinal axis of the chamber, and wherein the at least another set of electrodes is displaced along the longitudinal axis relative to the first set of electrodes.

2. The apparatus of claim 1, wherein the chamber includes an inlet at a first end and an outlet at a second opposing end thereof.

3. The apparatus of claim 2, wherein the inlet is located and configured to introduce a material into the chamber at a location which is substantially along a centerline of an arc produced by the first set of electrodes and the at least another set of electrodes.

4. The apparatus of claim 3, wherein the outlet is configured as a converging nozzle.

5. The apparatus of claim 1, wherein each electrode of the first set of electrodes is configured to be radially displaced relative to the longitudinal axis.

6. The apparatus of claim 5, wherein each electrode of the at least another set of electrodes is configured to be radially displaced relative to the longitudinal axis.

7. The apparatus of claim 6, further comprising a plurality of actuators, wherein each electrode of the first set of electrodes and each electrode of the at least another set of electrodes is coupled with an actuator of the plurality of actuators and displaceable thereby.

8. The apparatus of claim 7, further comprising a plurality of sliding assemblies associated with the plurality of actuators, wherein each sliding assembly comprises a first frame member substantially rigidly coupled with the chamber, at least one linear rod bearing coupled between the frame member and its associated actuator, and a sliding member coupled with an associated electrode and configured to be displaced substantially linearly along the at least one linear rod bearing.

9. The apparatus of claim 7, wherein the chamber further comprises a body having an internal surface, an external surface and at least one passage defined between the internal surface and the external surface.

10. The apparatus of claim 9, further comprising at least one cooling port in fluid communication with the at least one passage.

11. The apparatus of claim 10, wherein the body defines at least one opening from the external surface through the internal surface and wherein a viewing port is coupled with the at least one opening.

12. The apparatus of claim 6, wherein each electrode of the first set of electrodes extends at an acute angle relative to the longitudinal axis.

13. The apparatus of claim 12, wherein each electrode of the at least another set of electrodes extends at a substantially normal angle relative to the longitudinal axis.

14. The apparatus of claim 13, wherein each electrode of the first set of electrodes is disposed circumferentially about the longitudinal axis at an angle of approximately 120° relative to adjacent electrodes of the first set of electrodes.

15. The apparatus of claim 14, wherein each electrode of the at least another set of electrodes is disposed circumferentially about the longitudinal axis at an angle of approximately 120° relative to adjacent electrodes of the at least another set of electrodes.

16. The apparatus of claim 15, wherein the first set of electrodes exhibits a first circumferential orientation about the longitudinal axis and the at least another set of electrodes exhibits a second circumferential orientation about the longitudinal axis different than the first circumferential orientation.

17. The apparatus of claim 16, wherein the second circumferential orientation includes the electrodes of the at least another set of electrodes being rotated approximately 60° about the longitudinal axis relative to the electrodes of the first set of electrodes.

18. The apparatus of claim 1, wherein the at least another set of electrodes includes a second set of electrodes and a third set of electrodes displaced along the longitudinal axis relative to the second set of electrodes.

19. The apparatus of claim 1, wherein the electrodes are formed of a material comprising graphite.

20. The apparatus of claim 1, wherein the electrodes each include at least one metallic tubular member.

21. The apparatus of claim 20, wherein the at least one metallic tubular member includes a first metallic tubular member and a second metallic tubular member, wherein the second metallic tubular member is disposed within the first metallic tubular member and wherein the first and second tubular members are sized, located and configured to define an annular gap therebetween.

22. The apparatus of claim 21, further comprising an inlet in fluid communication with an interior portion of the second tubular member and an outlet in fluid communication with the annular gap.

23. The apparatus of claim 20, wherein each electrode further includes an electrode tip removably coupled with the at least one metallic tubular member.

24. An arc generating apparatus comprising:

a first set of electrodes comprising three electrodes, wherein each electrode of the first set of electrodes is configured to be coupled to a single phase of a three phase alternating current (AC) power supply, the three electrodes of the first set of electrodes being circumferentially disposed about a defined axis; and at least a another set of electrodes comprising three electrodes, wherein each electrode of the at least another set of electrodes is configured to be coupled to a single phase of another three phase alternating current (AC) supply, the three electrodes of the at least another set of electrodes being circumferentially disposed about the defined axis, and wherein the at least another set of electrodes is displaced from to the first set of electrodes along the defined axis.

25. The apparatus of claim 24, wherein each electrode of the first set of electrodes is configured to be radially displaced relative to the defined axis.

26. The apparatus of claim 25, wherein each electrode of the at least another set of electrodes is configured to be radially displaced relative to the defined axis.

27. The apparatus of claim 26, wherein each electrode of the first set of electrodes extends at an acute angle relative to the defined axis.

28. The apparatus of claim 27, wherein each electrode of the at least another set of electrodes extends at a substantially normal angle relative to the defined axis.

29. The apparatus of claim 28, wherein each electrode of the first set of electrodes is disposed circumferentially about the defined axis at an angle of approximately 120° relative to adjacent electrodes of the first set of electrodes.

30. The apparatus of claim 29, wherein each electrode of the at least another set of electrodes is disposed circumferentially about the defined axis at an angle of approximately 120° relative to adjacent electrodes of the at least another set of electrodes.

31. The apparatus of claim 30, wherein the first set of electrodes exhibits a first circumferential orientation about the defined axis and the at least another set of electrodes exhibits a second circumferential orientation about the defined axis different than the first circumferential orientation.

32. The apparatus of claim 31, wherein the second circumferential orientation includes the electrodes of the at least another set of electrodes being rotated approximately 60° about the defined axis relative to the electrodes of the first set of electrodes.

33. The apparatus of claim 32, wherein the at least another set of electrodes includes a second set of electrodes and a third set of electrodes displaced along the defined axis relative to the second set of electrodes.

34. The apparatus of claim 24, wherein the electrodes are formed of a material comprising graphite.

35. The apparatus of claim 24, wherein the electrodes each include at least one metallic tubular member.

36. The apparatus of claim 35, wherein the at least one metallic tubular member includes a first metallic tubular member and a second metallic tubular member, wherein the second metallic tubular member is disposed within the first metallic tubular member and wherein the first and second tubular members are sized, located and configured to define an annular gap therebetween.

37. The apparatus of claim 36, further comprising an inlet in fluid communication with an interior portion of the second tubular member and an outlet in fluid communication with the annular gap.

38. The apparatus of claim 35, wherein each electrode further includes an electrode tip removably coupled with the at least one metallic tubular member.

39. A plasma arc reactor comprising:

a first chamber section;

at least another chamber section wherein the first chamber section and the at least another chamber section are configured and located to at least partially define a chamber body;

a first set of electrodes comprising three electrodes disposed at least partially within the first chamber section, wherein each electrode of the first set of electrodes is configured to be coupled to a single phase of a three phase alternating current (AC) power supply, the three electrodes of the first set of electrodes being circumferentially disposed about a longitudinal axis of the chamber body; and at least another set of electrodes comprising three electrodes disposed at least partially within the at least another chamber section, wherein each electrode of the at least another set of electrodes is configured to be coupled to a single phase of another three phase alternating current (AC) supply, the three electrodes of the at least another set of electrodes being circumferentially disposed about the longitudinal axis of the chamber body, and wherein the at least another set of electrodes is displaced along the longitudinal axis relative to the first set of electrodes.

40. The reactor of claim 39, wherein each electrode of the first set of electrodes is configured to be radially displaced relative to the longitudinal axis.

41. The reactor of claim 40, wherein each electrode of the at least another set of electrodes is configured to be radially displaced relative to the longitudinal axis.

42. The reactor of claim 41, further comprising a plurality of actuators, wherein each electrode of the first set of electrodes and each electrode of the at least another set of electrodes is coupled with an actuator of the plurality of actuators and displaceable thereby.

43. The reactor of claim 42, wherein the first chamber section further comprises an internal surface, an external surface and at least one passage defined therebetween.

44. The reactor of claim 43, further comprising at least one cooling port in fluid communication with the at least one passage of the first chamber section.

45. The reactor of claim 44, wherein the at least another chamber section further comprises an internal surface, an external surface and at least one passage defined therebetween.

46. The reactor of claim 45, further comprising at least one cooling port in fluid communication with the at least one passage of the at least another chamber section.

47. The reactor of claim 42, wherein each electrode of the first set of electrodes extends at an acute angle relative to the longitudinal axis.

48. The reactor of claim 47, wherein each electrode of the at least another set of electrodes extends at a substantially normal angle relative to the longitudinal axis.

49. The reactor of claim 48, wherein the first set of electrodes exhibits a first circumferential orientation about the longitudinal axis and the at least another set of electrodes exhibits a second circumferential orientation about the longitudinal axis different than the first circumferential orientation.

50. The reactor of claim 39, wherein the at least another chamber section is removably coupled with the first chamber section.

51. The reactor of claim 39, wherein the at least another chamber section includes a second chamber section removably coupled to the first chamber section and a third chamber section removably coupled to the second chamber section, and wherein the at least another set of electrodes includes a second set of electrodes disposed at least partially within the second chamber section and a third set of electrodes disposed at least partially within the third chamber section.

52. The reactor of claim 39, further comprising a spacer disposed between and removably coupled to each of the first chamber section and the at least another chamber section.

53. A system for processing materials comprising:

a chamber having an inlet at a first end thereof and an outlet at a second end thereof;

a first set of electrodes comprising three electrodes, the three electrodes of the first set of electrodes being circumferentially disposed about a longitudinal axis of the chamber;

at least another set of electrodes comprising three electrodes, the three electrodes of the at least another set of electrodes being circumferentially disposed about the longitudinal axis of the chamber, and wherein the at least another set of electrodes is displaced along the longitudinal axis relative to the first set of electrodes;

a first power supply including three-phase alternating current (AC) electrical service wherein each phase of the first power supply is coupled to an individual electrode of the first set of electrodes;

at least another power supply including three-phase AC electrical service wherein each phase of the at least another power supply is coupled to an individual electrode of the at least another set of electrodes.

54. The system of claim 53, further comprising a cooling system located and configured to transfer thermal energy away from the chamber.

55. The system of claim 54, wherein the cooling system further comprises a heat exchanger and at least one cooling line located and configured to accommodate circulation of a cooling fluid between the chamber and the heat exchanger.

56. The system of claim 55, wherein the cooling system further comprises a pump located and configured to circulate a cooling fluid through the at least one cooling line.

57. The system of claim 53, wherein the first power supply includes a first silicon controlled rectifier (SCR).

58. The system of claim 57, wherein the first SCR is configured to control a firing of each electrode of the first set of electrodes according to a phase angle of each phase of the first power supply.

59. The system of claim 53, wherein the at least another power supply includes at least another silicon controlled rectifier.

60. The system of claim 59, wherein the at least another SCR is configured to control a firing of each electrode of the at least another set of electrodes according to a phase angle of each phase of the at least another power supply.

61. The system of claim 60, wherein each electrode of the first set of electrodes is configured to be radially displaced relative to the longitudinal axis.

62. The system of claim 61, wherein each electrode of the at least another set of electrodes is configured to be radially displaced relative to the longitudinal axis.

63. The system of claim 62, further comprising a plurality of actuators, wherein each electrode of the first set of electrodes and each electrode of the at least another set of electrodes is coupled with an actuator of the plurality of actuators and displaceable thereby.

64. The system of claim 63, further comprising a first measurement device located and configured to determine at least one of a current and a voltage of each phase of the first power supply and produce a first signal responsive thereto, and at least one other measurement device located and configured to determined at least one of a current an a voltage of each phase of the at least another power supply and produce at least another signal responsive thereto.

65. The system of claim 64, wherein the plurality of actuators are each configured to displace their associated electrodes responsive to at least one of the first signal and the at least another signal.

66. The system of claim 65, wherein the inlet is located and configured to introduce a material into the chamber at a location which is substantially along a centerline of an arc produced by the first set of electrodes and the at least another set of electrodes.

67. The system of claim 66, wherein the outlet is configured as a converging nozzle.

68. The system of claim 67, further comprising a separation device coupled to the outlet of the chamber.

69. The system of claim 68 wherein the separation device includes at least one of a cyclone and a filter.

70. The system of claim 65, wherein each electrode of the first set of electrodes extends at an acute angle relative to the longitudinal axis.

71. The system of claim 70, wherein each electrode of the at least another set of electrodes extends at a substantially normal angle relative to the longitudinal axis.

72. The system of claim 71, wherein the first set of electrodes exhibits a first circumferential orientation about the longitudinal axis and the at least another set of electrodes exhibits a second circumferential orientation about the longitudinal axis different than the first circumferential orientation.

73. A method of generating a plasma, the method comprising:

introducing a gas into a chamber;

providing a first set of electrodes including circumferentially disposing three electrodes about a longitudinal axis of the chamber;

providing at least another set of electrodes including circumferentially disposing three electrodes about the longitudinal axis and displaced along the longitudinal axis relative to the first set of electrodes;

coupling the first set of electrodes to a first power supply including coupling each electrode of the first set of electrodes to a phase of a three-phase alternating current (AC) power supply;

coupling the at least another set of electrodes to at least another power supply including coupling each electrode of the at least another set of electrodes to a phase of at least another three-phase power supply;

creating an arc among the first set of electrodes and the at least another set of electrodes within the chamber in the presence of the gas.

74. The method according to claim 73, further comprising determining at least one operational characteristic of the first power supply and at least one operational characteristic of the at least another power supply.

75. The method according to claim 74, wherein the determining at least one operational characteristic of the first power supply includes determining at least one of a current and a voltage of the first power supply, and wherein the determining at least one operational characteristic of the at least another power supply includes determining at least one of a current and a voltage of the at least another power supply.

76. The method according to claim 75, further comprising displacing at least one electrode of the first set of electrodes responsive to the determined at least one operational characteristic of the first power supply.

77. The method according to claim 76, further comprising displacing at least one electrode of the at least another set of electrodes responsive to the determined at least one operational characteristic of the at least another power supply.

78. The method according to claim 77, further comprising transferring thermal energy away from the chamber.

79. The method according to claim 77, further comprising controlling a phase angle of each phase of the first power supply.

80. The method according to claim 78, further comprising controlling a phase angle of each phase of the at least another power supply.

81. A method of generating a plasma, the method comprising:

introducing a gas into a chamber;

disposing at least a first plurality of electrodes at least partially within the chamber in a first circumferential arrangement about a longitudinal axis of the chamber such that a tip of at least one electrode is disposed a first distance from a tip of an adjacent electrode;

creating an arc among the at least a first plurality of electrodes in the chamber in the presence of a gas; and displacing the at least one electrode radially with respect to the longitudinal axis such that the tip of the at least one electrode is disposed at a second distance from the tip of the adjacent electrode while maintaining the arc.

82. The method according to claim 81, wherein the disposing at least a first plurality of electrodes at least partially within the chamber further includes substantially symmetrically arranging the at least a first plurality of electrodes circumferentially about the longitudinal axis of the chamber.

83. The method according to claim 82, wherein displacing the at least one electrode further includes displacing each electrode of the plurality of electrodes.

84. The method according to claim 83, wherein the creating an arc among the at least a first plurality of electrodes further includes providing electrical service to each electrode, the method further comprising determining at least one operational parameter associated with the electrical service provided to each electrode wherein the displacing each electrode is responsive to the determined at least one operational parameter.

85. The method according to claim 81, wherein the disposing at least a first plurality of electrodes at least partially within the chamber further includes circumferentially disposing a first set of electrodes at a first location along the longitudinal axis and circumferentially disposing at least a second set of electrodes at a second location along the longitudinal axis displaced from the first location.

* * * * *